US009600910B2

United States Patent
Wang et al.

(10) Patent No.: US 9,600,910 B2
(45) Date of Patent: Mar. 21, 2017

(54) ATTENUATION MAP RECONSTRUCTION FROM TOF PET DATA

(71) Applicants: Ge Wang, Loudonville, NY (US); Wenxiang Cong, Albany, NY (US); Qingsong Yang, Troy, NY (US)

(72) Inventors: Ge Wang, Loudonville, NY (US); Wenxiang Cong, Albany, NY (US); Qingsong Yang, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 3 days.

(21) Appl. No.: 14/592,691

(22) Filed: Jan. 8, 2015

(65) Prior Publication Data

US 2015/0193927 A1    Jul. 9, 2015

Related U.S. Application Data

(60) Provisional application No. 61/924,759, filed on Jan. 8, 2014.

(51) Int. Cl.
*G06K 9/00*        (2006.01)
*G06T 11/00*      (2006.01)
*G01T 1/164*      (2006.01)

(52) U.S. Cl.
CPC .......... *G06T 11/003* (2013.01); *G01T 1/1647* (2013.01)

(58) Field of Classification Search
None
See application file for complete search history.

(56) References Cited

U.S. PATENT DOCUMENTS

2008/0212860 A1*  9/2008  Schomberg .......... G06T 11/006
                                                            382/131
2013/0028496 A1*  1/2013  Panin .................... G06T 11/006
                                                            382/131

OTHER PUBLICATIONS

Bronnikov, Andrei V. "Reconstruction of Attenuation Map Using Discrete Consistency Conditions," *IEEE Transactions on Medical Imaging*, 2000, 19(5):451-462.
Chartrand, Rick. "Numerical Differentiation of Noisy, Nonsmooth Data," *International Scholarly Research Network (ISRN) Applied Mathematics*, 2011, Article ID 164564, p. 1-11.
Cong, Wenxiang et al., "Fourier transform-based iterative method for differential phase-contrast computed tomography," *Optics Letters*, 2012, 37(11):1784-1786.
Conti, Maurizio. "State of the art and challenges of time-of-flight PET," *Physica Medica*, 2009, 25(1):1-11.
Defrise, Michel et al., "Time-of-flight PET data determine the attenuation sonogram up to a constant," *Physics in Medicine and Biology*, 2012, 57(4):885-899.

(Continued)

*Primary Examiner* — Hadi Akhavannik
(74) *Attorney, Agent, or Firm* — Saliwanchik, Lloyd & Eisenschenk (57) ABSTRACT

Advantageous methods, systems, and computer-readable media are provided. An attenuation map for an image can be reconstructed with no known sub-region of the attenuation map prior to performing the method. Gradient data of an attenuation sinogram can be estimated, and an algorithm can be performed to reconstruct the attenuation map from the estimated gradient data of the attenuation sinogram.

22 Claims, 7 Drawing Sheets
(5 of 7 Drawing Sheet(s) Filed in Color)

(56) References Cited

OTHER PUBLICATIONS

Gould, K. Lance et al., "Frequent Diagnostic Errors in Cardiac PET/CT Due to Misregistration of CT Attenuation and Emission PET Images: A Definitive Analysis of Causes, Consequences, and Corrections," *The Journal of Nuclear Medicine*, 2007, 48(7):1112-1121.

Karp, Joel S. et al., "Benefit of Time-of-Flight in PET: Experimental and Clinical Results," *The Journal of Nuclear Medicine*, 2008, 49(3):462-470.

Köhler, Thomas et al., "Iterative Reconstruction for Differential Phase Contrast Imaging," *Medical Physics*, 2011, 38:4542-4545.

Nuyts, Johan et al., "Simultaneous maximum a-posteriori reconstruction of attenuation and activity distributions from emission sonograms," *IEEE Transactions on Medical Imaging*, 1999, 18(5):393-403.

Park, Sang-Jun. et al., "Evaluation of the combined effects of target size, respiratory motion and background activity on 3D and 4D PET/CT images," *Physics in Medicine and Biology*, 2008, 53(13):3661-3679.

Rezaei, Ahmadreza et al., "Simultaneous Reconstruction of Activity and Attenuation in Time-of-Flight PET," *Nuclear Science Symposium and Medical Imaging Conference (NSS/MIC)*, 2011, p. 2375-2382.

Xia, Ting et al., "Limits of Ultra-Low Dose CT Attenuation Correction for PET/CT," *IEEE Nuclear Science Symposium Conference Record (NSS/MIC)*, 2009, p. 3074-3079.

Xia, Ting et al., "Ultra-low dose CT attenuation correction for PET/CT," *Physics in Medicine and Biology*, 2012, 57(2):309-328.

Yan, Ming et al., "Expectation Maximization and Total Variation Based Model for Computed Tomography Reconstruction from Undersampled Data," *SPIE Medical Imaging*, 2011, 7961:1-8.

Zaidi, Habib et al., "Determination of the Attenuation Map in Emission Tomography," *The Journal of Nuclear Medicine*, 2003, 44(2):291-315.

\* cited by examiner (a)            (b)

ATTENUATION MAP RECONSTRUCTION FROM TOF PET DATA

CROSS-REFERENCE TO A RELATED APPLICATION

The present application claims the benefit of U.S. Provisional Application Ser. No. 61/924,759, filed Jan. 8, 2014, which is incorporated by reference herein in its entirety, including any figures, tables, and drawings.

BACKGROUND OF INVENTION

In quantitative positron emission tomography (PET) imaging, the attenuation background of the tissue is necessary to reconstruct a radioactive tracer distribution. A PET image reconstructed with an incorrect attenuation map or without this information would suffer from significant attenuation artifacts. Methods for estimating an attenuation map can be generally categorized into two main classes, transmission and non-transmission.

Transmission methods are based on transmission data acquisition with an external radionuclide source, computed tomography (CT), or magnetic resonance imaging (MRI) scan. In a PET/CT system, attenuation correction can be achieved with the CT component. However, there are significant mismatches between not only CT and PET attenuation backgrounds but also their geometrical accuracies, which can cause substantial artifacts. When a correlation between CT and PET linear attenuation coefficients is established, low dose CT for attenuation correction has been used (Xia et al., "Limits of ultra-low dose CT attenuation correction for PET/CT," *Nuclear Science Symposium Conference Record (NSS/MIC)*, 2009 IEEE; Xia et al., "Ultra-low dose CT attenuation correction for PET/CT," *Physics in Medicine and Biology*, 2012, 57(2):309). To compensate for the respiratory motion, a long CT acquisition time can be used.

Non-transmission methods derive the attenuation map without a separate transmission scan. In the case of brain or abdominal imaging, in which soft tissue is the dominant constituent, a uniform attenuation coefficient is assigned within a contour, which can be obtained manually or automatically. Other non-transmission methods estimate the attenuation map from the emission data alone. Welch et al. used the consistency condition of the Radon transform to estimate regions of fairly uniform attenuation (Welch et al., "Attenuation correction in PET using consistency information," *IEEE Transactions on Nuclear Science*, 1998, 45(6): 3134-3141). Bronnikov utilized a discrete consistency condition for the same purpose (Bronnikov, "Reconstruction of attenuation map using discrete consistency conditions," *IEEE Transactions on Medical Imaging*, 2000, 19(5):451-462). In addition, techniques that attempt to reconstruct the activity and the attenuation simultaneously based on a statistical model have suffered from cross-talk artifacts.

BRIEF SUMMARY

The subject invention provides novel and advantageous methods, systems, and computer-readable media, capable of reconstructing an attenuation map for an image (e.g., a positron emission tomography (PET) image) without any prior known sub-region of the attenuation map. In many cases, the attenuation map can be reconstructed without any prior knowledge or information about the attenuation map at all. That is, no information about the attenuation map is necessary prior to performing the method. In many embodiments, time-of-flight (TOF) PET data of a PET image can be used, and the TOF PET data can include no known sub-region in the attenuation map to be estimated. In certain embodiments, the TOF PET data can include no information about the attenuation map (e.g., about the attenuation map of a computed tomography (CT) image). The TOF PET data can include no attenuation information (e.g., attenuation map, attenuation sinogram, etc.) at all.

In an embodiment, a method for reconstructing an attenuation map for a positron PET image can include: obtaining TOF PET data of the PET image; estimating the gradient of an attenuation sinogram; and determining the attenuation map using the estimated gradient of the attenuation sinogram by performing an algorithm. No sub-region in the attenuation map is known prior to performing the method (e.g., no prior knowledge of any sub-region of the attenuation map to be reconstructed is necessary prior to estimating the gradient of the attenuation sinogram). One or more of the steps of the method can be performed by a processor. The algorithm can be in the spirit of X-ray differential phase-contrast tomography. The algorithm can be, for example, a filtered back-projection (FBP) type algorithm, a back-projection filtration (BPF) type algorithm, or an iterative reconstruction algorithm.

In another embodiment, a computer-readable medium can have computer-executable instructions for performing a method, and the method can include: obtaining TOF PET data of a PET image; estimating the gradient of an attenuation sinogram; and determining the attenuation map using the estimated gradient of the attenuation sinogram by performing an algorithm. No sub-region in the attenuation map is known prior to performing the method (e.g., no prior knowledge of any sub-region of the attenuation map to be reconstructed is necessary prior to estimating the gradient of the attenuation sinogram). One or more of the steps of the method can be performed by a processor. The algorithm can be in the spirit of X-ray differential phase-contrast tomography. The algorithm can be, for example, an FBP type algorithm, a BPF type algorithm, or an iterative reconstruction algorithm.

BRIEF DESCRIPTION OF THE DRAWINGS

The patent or application file contains at least one drawing executed in color. Copies of this patent or patent application publication with color drawings will be provided by the Patent Office upon request and payment of the necessary fee.

DETAILED DISCLOSURE

The subject invention provides novel and advantageous methods, systems, and computer-readable media, capable of reconstructing an attenuation map for an image (e.g., a positron emission tomography (PET) image) without any prior known sub-region of the attenuation map. In many cases, the attenuation map can be reconstructed without any prior knowledge or information about the attenuation map at all. That is, no information about the attenuation map is necessary prior to performing the method. In many embodiments, no attenuation information is known prior to estimating the gradient of the attenuation sinogram (i.e., no attenuation information, including attenuation map information, is necessary prior to estimating the gradient of the attenuation sinogram, at which point such information is only known because it was obtained using the method; thus, no external attenuation information is needed at all). In some embodiments, no sub-region in the attenuation map to be estimated is known prior to performing the method (e.g., prior to obtaining the TOF PET data, prior to estimating the gradient of the attenuation sinogram, or prior to determining or reconstructing the attenuation map). Other information about the attenuation map may or may not be known prior to performing the method.

In many embodiments, time-of-flight (TOF) PET data of a PET image can be used, and the TOF PET data can include no known sub-region in the attenuation map to be estimated. In certain embodiments, the TOF PET data can include no information about the attenuation map (e.g., about the attenuation map of a computed tomography (CT) image). The TOF PET data can include no attenuation information (e.g., attenuation map, attenuation sinogram, etc.) at all (e.g., about a CT image).

In many embodiments, some prior information on the attenuation map and/or some prior information on TOF PET data may be known (i.e., some information may be known prior to performing the method). Alternatively, if high quality TOF PET data are used, no information about the attenuation map may be known prior to performing the method (e.g., prior to estimating the gradient of the attenuation sinogram).

In many embodiments, the gradient of the attenuation sinogram of an image (e.g., a PET image) can be estimated. The attenuation map for the image can then be reconstructed or determined using the estimated gradient of the attenuation sinogram by performing an algorithm. The algorithm can be in the spirit of X-ray differential phase-contrast tomography. The algorithm can be, for example, a filtered back-projection (FBP) type algorithm, a back-projection filtration (BPF) type algorithm, or an iterative reconstruction algorithm.

TOF PET has recently come into practice, due at least in part to ultrafast electronics and scintillation material. In TOF PET, a pair of photons from an annihilation location is measured in a time-resolving fashion, which provides a better localization of coincidence events along the line-of-response (LOR) than in the situation with conventional PET. The TOF PET technique is described in more detail in Conti et al. ("State of the art and challenges of time-of-flight PET," *Physica Medica*, 2009, 25(1):1-11) and Karp et al. ("Benefit of time-of-flight in PET: experimental and clinical results," *Journal of Nuclear Medicine*, 2008, 49(3):462-470), both of which are hereby incorporated by reference in their entireties.

TOF PET data contain important information on attenuation coefficients. A maximum-a-posterior reconstruction algorithm has been proposed to simultaneously reconstruct both tracer concentrations and attenuation coefficients from a TOF PET scan. In addition, the gradient of the attenuation sinogram has been proven to be uniquely computable only from TOF PET data. However, there has as of yet been no scheme proposed to estimate the absolute attenuation background only from the gradient of the attenuation sinogram.

Defrise et al. suggested prior knowledge on the attenuation background is necessary to find this constant term (Defrise et al., "Time-of-flight PET data determine the attenuation sinogram up to a constant," *Physics in Medicine and Biology*, 2012, 57(4):885-899). The Defrise et al. article referenced in the previous sentence is hereby incorporated by reference in its entirety, and the method discussed therein is hereinafter referred to as "the Defrise-Rezaei-Nuyts comparison method".

Embodiments of the subject invention advantageously eliminate the above-mentioned constant uncertainty for self-sufficient TOF PET imaging. Many embodiments are related to differential projection based tomographic imaging, where it is feasible to exactly (or in some cases approximately) reconstruct an image from derivatives of the sinogram using an algorithm, such as an analytical or iterative algorithm. According to embodiments of the subject invention, TOF PET data can be used to accurately determine or estimate attenuation data (e.g., an attenuation sinogram and the attenuation correction map, an attenuation background, a tracer distribution) without any specific knowledge (e.g., any prior knowledge before the method is performed) on it. For example, no information about any sub-region of the attenuation map may be known prior to performing the method. In an embodiment, a least-square estimation method can be used to estimate derivatives of an attenuation sinogram, and an image reconstruction algorithm can be used for TOF PET.

In many embodiments, data (e.g., TOF PET data) can be used to estimate gradient data of the attenuation sinogram of an image (e.g., a PET image). The estimated gradient data can then be used to determine the attenuation map for the image (e.g., PET image). Advantageously, an accurate reconstruction of the attenuation map can be obtained though no sub-region in the attenuation map is known prior to performing the method (e.g., prior to obtaining the TOF PET data, prior to estimating the gradient data, or prior to determining the attenuation map). The reconstruction of the attenuation map from the estimated gradient data can be similar to what can be done for X-ray differential phase-contrast image reconstruction. In certain embodiments, no information about the attenuation map (or even no attenuation information at all) need be known prior to estimating the gradient data.

Let us denote a radioactive tracer distribution as $f(x,y)$. In 2D conventional PET, the measurement along a line can be expressed as $$m(\theta,s) = p(\theta,s) e^{-g(\theta,s)}, \quad (1)$$

where $p(\theta,s)$ is the generic PET data without attenuation in parallel-beam geometry, $$p(\theta,s) = \int_{-\infty}^{\infty} f(s\cos\theta - l\sin\theta, s\sin\theta + l\cos\theta) dl, \quad (2)$$

and $g(\theta,t)$ is the Radon transform of the attenuation background $\mu(x,y)$, $$g(\theta,s) = \int_{-\infty}^{\infty} \mu(s\cos\theta - l\sin\theta, s\sin\theta + l\cos\theta) dl. \quad (3)$$

In TOF PET, due to the limited time resolution the measurement can be modeled as $$p(\theta,s,t) = \int_{-\infty}^{\infty} f(s\cos\theta - l\sin\theta, s\sin\theta + l\cos\theta) w(t-l) dl, \quad (4)$$

where $w(t)$ is a time profile, which is assumed as a Gaussian function with a standard deviation $\sigma < \infty$, $$w(t) = \frac{1}{\sqrt{2\pi}\,\sigma} e^{-t^2/2\sigma^2} \quad (5)$$

The Defrise-Rezaei-Nuyts comparison method demonstrates that an attenuation sinogram can be determined by TOF PET data up to a constant shift, as stated in the following theorem:

Theorem 1: The emission data $m(\theta,s,t)$ determine derivatives of the Radon transform $g(\theta,s)$ over $\theta$ and $s$ if (1) the TOF time profile is a Gaussian function; (2) for each measured line of response (LOR), the TOF data are measured for all $t \in \mathbb{R}$; (3) $f(x,y)$ and $\mu(x,y)$ are non-negative functions with continuous first derivatives and bounded supports; and (4) no LOR is totally attenuated so that $e^{g(\theta,s)} > 0$ for all $\theta$ and $s$.

Based on the proof of the theorem, an analytical scheme for estimation of the gradient of the attenuation sinogram can be given as follows:

$$\frac{\partial g}{\partial s} = -\frac{J_s H_{\theta\theta} - J_\theta H_{s\theta}}{H_{ss} H_{\theta\theta} - H_{s\theta}^2} \quad (6)$$

$$\frac{\partial g}{\partial \theta} = -\frac{J_\theta H_{ss} - J_s H_{s\theta}}{H_{ss} H_{\theta\theta} - H_{s\theta}^2}$$

where $$H_{ss} = \int_\tau (mt + \sigma^2 \partial_t m)^2 dt, \quad (7)$$

$$H_{s\theta} = \int_\tau m(mt + \sigma^2 \partial_t m) dt,$$

$$H_{\theta\theta} = \int_\tau m^2 dt,$$

$$J_s = \int_\tau (D[m])(mt + \sigma^2 \partial_t m) dt,$$

$$J_\theta = \int_\tau (D[m]) m \, dt,$$

and the operator $D[\cdot]$ is defined as $$D[m(\theta,s,t)] = t\frac{\partial m}{\partial s} + \frac{\partial m}{\partial \theta} - s\frac{\partial m}{\partial t} + \sigma^2 \frac{\partial^2 m}{\partial s \partial t}. \quad (8)$$

The proof of Corollary 2 in Defrise et al. (supra.) is based on the integral over a projection view, from which the conclusion of a constant offset is obtained. However, embodiments of the subject invention advantageously underline that with sufficiently many views the constant offset must be zero, and there will be no non-zero uniform constant value in the attenuation sinogram. This point can be demonstrated utilizing a differentiated back-projection method.

Using the relationship between the back-projection of differentiated attenuation projection data and the Hilbert transform of the attenuation background, Equation (9) can be obtained:

$$H_\theta \mu(x,y) = -\frac{1}{2\pi} \int_\theta^{\theta+\pi} \left.\frac{\partial g(s,\theta)}{\partial s}\right|_{s=x\cos\theta + y\sin\theta} d\theta \quad (9)$$

where $H_\theta$ is the Hilbert transform along direction $n = (-\sin\theta, \cos\theta)$. Performing the inverse Hilbert transform for Equation (9), Equation (10) can be obtained:

$$\mu(x, y) = -\frac{1}{2\pi} H_\theta^{-1} \int_\theta^{\theta+\pi} \frac{\partial g(s, \theta)}{\partial s}\bigg|_{s=x\cos\theta+y\sin\theta} d\theta \quad (10)$$

Equation (10) is a close-form formula to uniquely determine an attenuation background from a differentiated attenuation sinogram. This inversion process can be implemented accurately and with stability using analytic or iterative methods. Examples of such analytic methods can be found in Faris et al., ("Three-dimensional beam-deflection optical tomography of a supersonic jet," *Applied Optics*, 1988, 27(24):5202-5212), and examples of such iterative methods can be found in Cong et al. ("Fourier transform-based iterative method for differential phase-contrast computed tomography," *Optics Letters*, 2012, 37(11):1784-1786) and Kohler et al. ("Iterative reconstruction for differential phase contrast imaging using spherically symmetric basis functions," *Med. Phys.*, 2011, 38:4542-4545); all three of these articles are hereby incorporated by reference in their entireties.

By Theorem 1, TOF PET data uniquely determine the differentiated attenuation sinogram. Hence, TOF PET data $m(\theta,s,t)$ can uniquely determine the attenuation sinogram.

Based on the same principle, this conclusion also holds for 3D image reconstruction of TOF PET. In the 3D TOF PET mode, LORs between different rings are allowed as well, acquiring data three-dimensionally. Re-binning techniques can transform 3D data to a series of 2D problems and successively perform 2D image reconstruction for a contiguous stack of 2D image planes. Truly 3D TOF PET reconstruction methods can also be developed in reference to 3D CT reconstruction results that are directly or indirectly based on the Grangeat-Smith-Tuy Condition.

The following analytical method can be used to reconstruct the attenuation map from the derivatives of the sinogram. This method can be derived from the classical filtered back-projection algorithm:

$$\mu(x,y) = \int_\theta^{\theta+\pi} \int_{-\infty}^{+\infty} \mathcal{F}[g(s,\theta)]|\omega|e^{2\pi i\omega(x\sin\theta+y\sin\theta)} d\theta \quad (11)$$

where $\mathcal{F}$ is the Fourier transform. Let us decompose the filter kernel as $$|\omega| = 2\pi i\omega\left[\frac{1}{2\pi}(-i\mathrm{sgn}\omega)\right] \quad (12)$$

and note that $$\mu(x, y) = \int_\theta^{\theta+\pi} \int_{-\infty}^{+\infty} \mathcal{F}\left[\frac{\partial g(s, \theta)}{\partial s}\right]\left[\frac{1}{2\pi}(-i\mathrm{sgn}\omega)\right] e^{2\pi i\omega(x\sin\theta+y\sin\theta)} d\theta \quad (14)$$

Hence, Equation (11) becomes $$\mu(x, y) = \int_\theta^{\theta+\pi} \int_{-\infty}^{+\infty} \mathcal{F}\left[\frac{\partial g(s, \theta)}{\partial s}\right]\left[\frac{1}{2\pi}(-i\mathrm{sgn}\omega)\right] e^{2\pi i\omega(x\sin\theta+y\sin\theta)} d\theta \quad (14)$$

which is a modified filtered back-projection method.

In many embodiments of the subject invention, instead of recovering the attenuation sinogram directly from its derivatives, an indirect method is used. The derivatives can be estimated (e.g., with Equation (6)). Then, a modified filtered back-projection algorithm (e.g., based on Equation (14)) can be used to reconstruct the attenuation map. The sinogram can then obtained by a forward projection of the reconstructed attenuation map.

Though Equation (14) is for a 2D plane, methods of the subject invention can be readily extended to handle a 3D case with an attenuation map $\mu(x,y,z)$. For example, such a case can be handled in cone-beam and/or other imaging geometries. That is, extended formulations in cone-beam or other geometries in reference to analytic or iterative cone-beam reconstruction work in the X-ray CT field can be used in addition to, as part of, or instead of the algorithms discussed herein for determining the attenuation map.

Embodiments of the subject invention can include an analytic reconstruction technique to recover an attenuation sinogram based on Theorem 1. In the estimation formula Equation (6), the denominator could be very small or zero in a real TOF PET scan, thereby introducing artifacts in a reconstructed image. When the denominator $H_{ss}H_{\theta\theta}-H_{s\theta}^2$ vanishes, it is derived that $$m = C(mt+\sigma^2 \partial_t m), \quad (15)$$

and the numerator is also zero since $$J_s H_{\phi\phi} - J_\phi H_{s\phi} = \quad (16)$$

$$\int_\tau (D[m])\frac{1}{c} m d t \int_\tau m^2 dt - \int_\tau (D[m]) m d t \int_{\tau'} m\frac{1}{c} m d t = 0$$

Figure 1A:
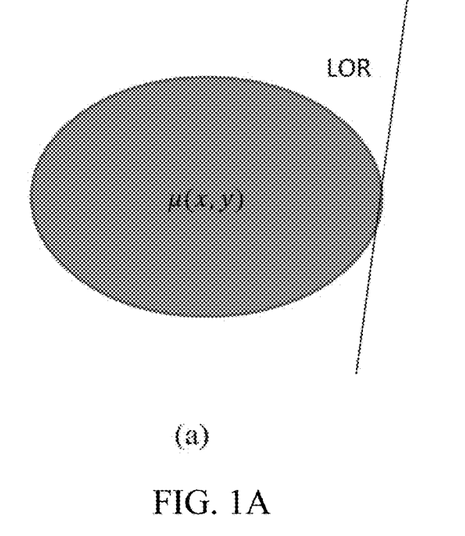
FIG. 1A shows a diagram illustrating a single point source effect.

In this case, the solution of the differential equation—Equation (15)—is $$m = ke^{-\frac{C(t-1/C)^2}{2\sigma^2}}$$

where k is a constant. This case means that the LOR contains only a point source:

$$\mathrm{Lor}(t)=\delta(t-t_0), \quad (17)$$

and the derivative cannot be calculated. A LOR of a point source is generated only when it touches the boundary of an object. FIG. 1A shows a diagram illustrating a single point source effect in such a case. If $\sigma$ in the time profile is large or the time resolution is not high enough, there is a chance that the system cannot distinguish even a short line source and can take it as a single point source.

Figure 1B:
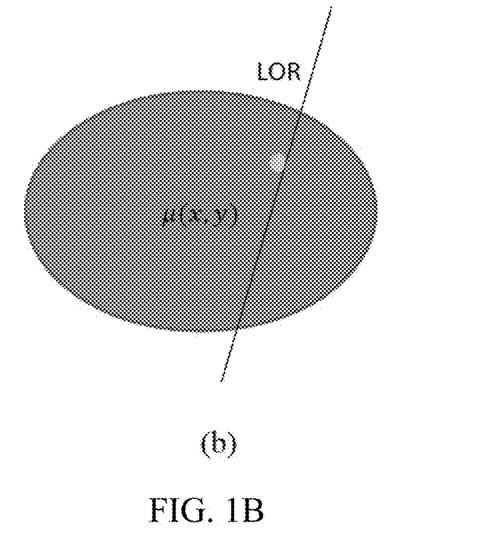
FIG. 1B shows a diagram illustrating a single point source effect.

Another boundary case is that the LOR passes through the boundary of a region containing a high tracer concentration. FIG. 1B shows a diagram illustrating a single point source effect in such a case. This makes a relatively strong point source along this LOR.

Noise in measured data can propagate as derivatives of a sinogram are sequentially estimated (e.g., using Equations (6)-(8)). An approximate error analysis indicates $$\mathrm{Var}\left(\frac{\partial g(\theta, s)}{\partial s}\right) \approx \frac{\Delta_t \epsilon^2 H_{ss}}{H_{ss}H_{\phi\phi} - H_{s\phi}^2} \quad (18)$$

where $\Delta_t$ is the TOF sampling step, and $\epsilon^2$ is the variance of noise in $D[m]$. Because $D[m]$ involves a second derivative, $\epsilon^2$ is actually greatly amplified compared to noise in measured data $m(\theta,s,t)$. If $H_{ss}H_{\phi\phi}-H_{s\phi}^2$ is not too small, the derivatives can be well estimated. However, the denominator $H_{ss}H_{\phi\phi}-H_{s\phi}^2$ vanishes in a boundary case, and the noise becomes a problem, which must be handled with prior knowledge and special care.

Methods of the subject invention can be performed by a processor (e.g., a processor of a computing device, though embodiments are not limited thereto). That is, one or more steps of any method described herein can be performed by a processor.

In many embodiments, a computer-readable medium can have computer-executable instructions for performing a method as described herein. For example, such a method can include: obtaining TOF PET data of a PET image; estimating the gradient of an attenuation sinogram of the PET image; and determining the attenuation map for the PET image using the estimated gradient of the attenuation sinogram by performing an algorithm. No prior knowledge about the attenuation map is necessary prior to performing the method (e.g., no prior knowledge or attenuation information is necessary prior to estimating the gradient of the attenuation sinogram). The algorithm can be, for example, a filtered back-projection algorithm.

Embodiments of the subject invention can be used to obtain estimated and/or reconstructed attenuation data (e.g., attenuation map, attenuation background, sinogram, tracer distribution, attenuation correction map) from PET data (e.g., TOF PET data). Such attenuation data can be estimated without any prior knowledge on the attenuation data (e.g., attenuation background, sinogram, tracer distribution, attenuation correction map). No such knowledge is needed prior to initiating the method or even prior to estimating the gradient or gradient data of the attenuation sinogram. In some embodiments, no sub-region in the attenuation map to be estimated is known prior to performing the method (e.g., prior to obtaining the TOF PET data, prior to estimating the gradient of the attenuation sinogram, or prior to determining the attenuation map). Other information about the attenuation map may or may not be known prior to performing the method. In many embodiments, TOF PET data can be used, and the TOF PET data can include no known sub-region in the attenuation map to be estimated. In certain embodiments, the TOF PET data can include no information about the attenuation map (e.g., about the attenuation map of a computed tomography (CT) image). The TOF PET data can include no attenuation information (e.g., attenuation map, attenuation sinogram, etc.) at all (e.g., no attenuation information about a CT image).

Figure 5:
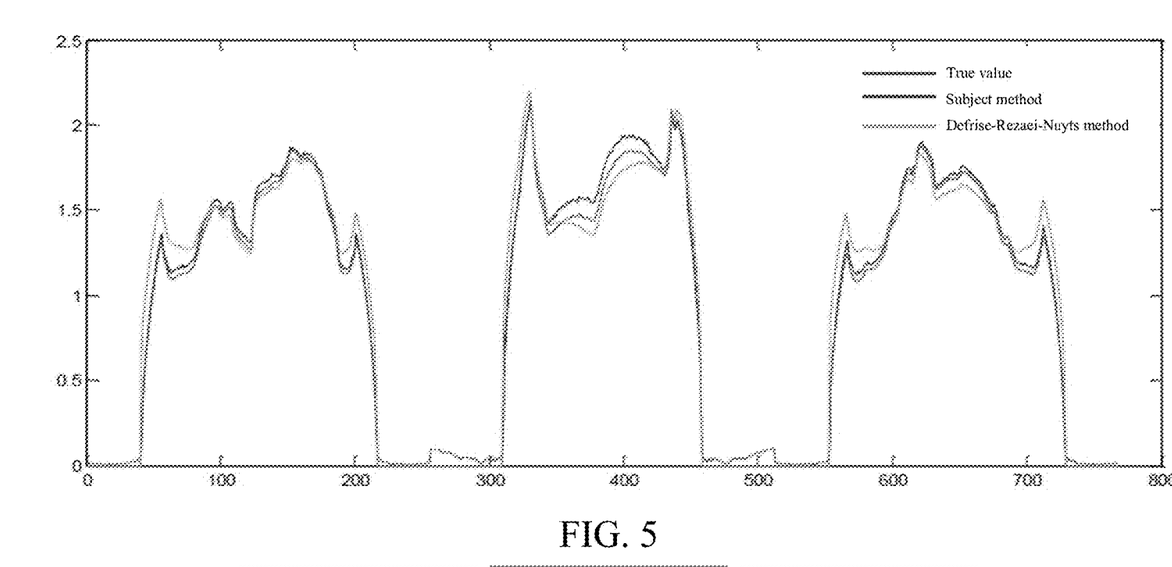
FIG. 5 shows a comparison of profiles in the sinogram domain.

The estimated data can be in excellent agreement with both the true values and the outcome produced using the Defrise-Rezaei-Nuyts comparison method, which utilizes prior knowledge to eliminate the constant uncertainty in the attenuation sinogram estimation. This is true whether noise is present in the PET data or not. The elimination of the need for prior knowledge, such as knowledge of one or more sub-regions of the attenuation map (as with the Defrise-Rezaei-Nuyts comparison method) is a major advantage over the related art. Embodiments of the subject invention allow for a re-projected or reconstructed sinogram to be used for data correction, leading to substantially accurate reconstruction of an underlying tracer distribution. Again, no prior knowledge is required. For example, the profiles in FIG. 5 show that the subject method compares favorably with the Defrise-Rezaei-Nuyts comparison method.

Embodiments of the subject invention can tolerate noise in PET data (e.g., TOF PET data). Though, when strong noise is involved, the estimation can potentially suffer from even more serious noise, especially around boundaries in the sinogram. Methods can be used to suppress strong data noise. Also, high time resolution can be obtained using embodiments of the subject invention, and an iterative or analytical algorithm can be used to reconstruct an attenuation image from derivatives. A de-noising process can also, or alternatively, be used when noise is high. Gaussian smoothing on the TOF PET data can suppress noise and errors introduced by finite difference to a certain degree, but it can also blur the sinogram, compromising image quality. Nonlinear de-noising and TV regularization, as detailed by Chartrand ("Numerical differentiation of noisy, nonsmooth data," ISRN Applied Mathematics, 2011), which is hereby incorporated by reference in its entirety, can be used to deal with numerical differentiation.

Though the Defrise-Rezaei-Nuyts comparison method requires that emission data is known as prior knowledge to determine the sinogram of an attenuation image up to an additive constant, embodiments of the subject invention can uniquely determine the sinogram of an attenuation image without the constant ambiguity and without any prior knowledge. Certain embodiments of the subject invention are in the spirit of differential phase contrast tomography. Any reconstruction algorithm for differential phase contrast imaging could be adapted for TOF PET and used in an embodiment of the subject invention.

According to many embodiments, prior knowledge about the attenuation map can be available or unavailable to help the attenuation map reconstruction, and in principle such prior knowledge is not necessary if the TOF PET data are of high quality. In certain embodiments, no or some attenuation information is known prior to performing the method, and prior knowledge on TOF PET data may be available or unavailable to improve TOF PET data quality in the cases of, e.g., low temporal resolution or high noise.

The methods and processes described herein can be embodied as code and/or data. The software code and data described herein can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

Figure 2A:
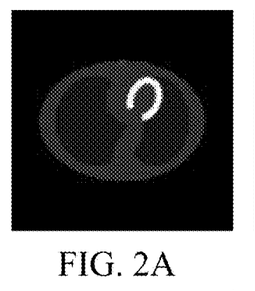
FIG. 2A shows a numerical phantom of a tracer distribution.
Figure 2B:
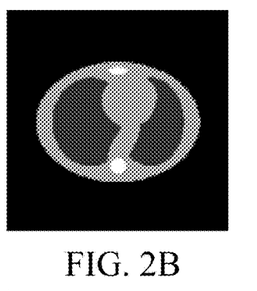
FIG. 2B shows a numerical phantom of an attenuation background.

A 2D TOF PET study was numerically performed. The numerical phantom used had most of the parameters identical to those in the Defrise-Rezaei-Nuyts comparison method (see, e.g., Defrise et al., supra.). FIGS. 2A (tracer distribution) and 2B (attenuation background) show the numerical phantoms used. The field of view (FOV) was set to 40 cm in diameter, and sampled into an image of 384×384 pixels (pixel size 0.104 cm). TOF PET data were synthesized by convolving the image with the 1D Gaussian profile of a standard deviation $$\sigma_t = \frac{FWHM}{2\sqrt{2\ln 2}},$$

where FWHM is the full-width at half-maximum of the Gaussian profile. The attenuation factors were separately calculated. In all the tests, the following were assumed: 256 detectors, 256 view angles over an 180° angular range and 128 time bins covering the FOV. Hence, the simulated TOF PET data were a tensor of 256×256×128 with sampling steps $\Delta_s=0.1562$ cm, $\Delta_\theta=0.7031°$ and $\Delta_t=0.3125$ cm with respect to s, θ, and t, respectively.

Figure 2C:
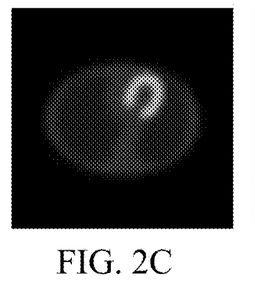
FIG. 2C shows a smoothened version of the tracer distribution of FIG. 2A.
Figure 2D:
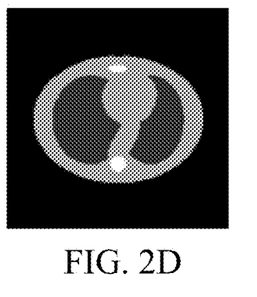
FIG. 2D shows a numerical phantom of an attenuation background.

Theorem 1 was based on the assumption that the tracer distribution μ(x,y) was continuously differentiable. Therefore, a smoothened μ(x,y) was used first. FIG. 2C shows the smoothened versions of the tracer distribution of the numerical phantom used, and FIG. 2D shows the corresponding attenuation background. Referring to FIG. 2D, the attenuation background was correspondingly enlarged when the tracer distribution was smoothened. To suppress the boundary effect, the time resolution was set to 100 picoseconds (ps), corresponding to an FWHM of 1.5 cm. No noise was included.

Figure 3A:
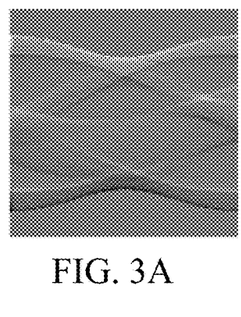
FIG. 3A shows an estimated derivative.
Figure 3B:
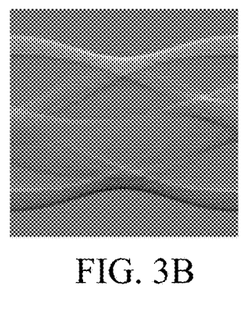
FIG. 3B shows the true value for the estimation in FIG. 3A.

The derivatives of the attenuation sinogram along s were estimated by Equation (6). The derivatives were approximated as finite differences. The integrals over t were implemented as a Riemann sum. FIG. 3A shows the estimated derivatives along s, and FIG. 3B shows the true values of the estimates in FIG. 3A. From the estimation, the attenuation map was reconstructed and a forward projection was performed to obtain the sinogram. For comparison, the Defrise-Rezaei-Nuyts comparison method was implemented. The sinogram was directly recovered from the derivatives, and the constant error K was corrected using a least-square (LS) method which minimizes $\|K+g_{estimated}-g_{true}\|_2^2$. Because the boundaries were not accurate, this LS estimation used only a central region of the sinogram. The attenuation map was reconstructed using the classical filtered back-projection algorithm. Equation (14) was implemented by replacing the filter from the iradon( ) function to the sgn( ) function in MATLAB.

Figure 4A:
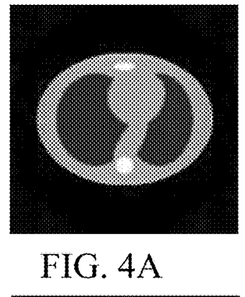
FIG. 4A shows an attenuation map based on an embodiment of the subject invention.
Figure 4B:
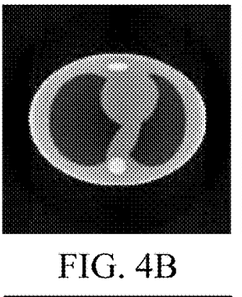
FIG. 4B shows an attenuation map based on a comparison method.
Figure 4C:
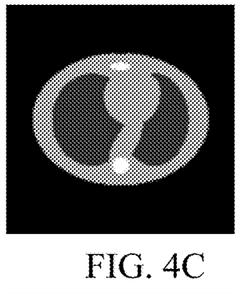
FIG. 4C shows a true value of the attenuation map.
Figure 4D:
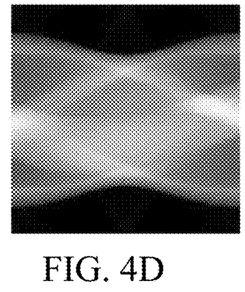
FIG. 4D shows a sinogram corresponding to the attenuation map of FIG. 4A.
Figure 4E:
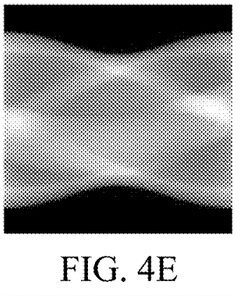
FIG. 4E shows a sinogram corresponding to the attenuation map of FIG. 4B.
Figure 4F:
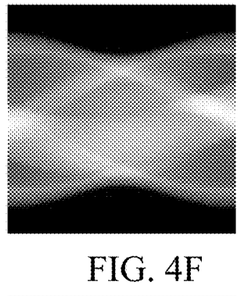
FIG. 4F shows a sinogram corresponding to the attenuation map of FIG. 4C.
Figure 4G:
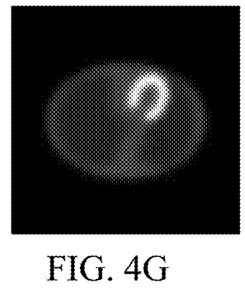
FIG. 4G shows a reconstructed tracer distribution based on an embodiment of the subject invention.
Figure 4H:
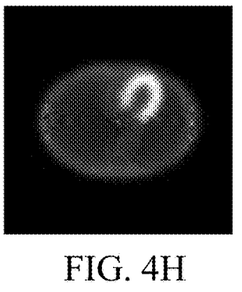
FIG. 4H shows a reconstructed tracer distribution based on a comparison method.
Figure 4I:
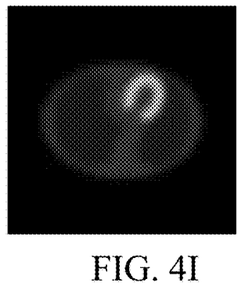
FIG. 4I shows a true value of the tracer distribution.

FIGS. 4A, 4B, and 4C show an attenuation map based on the subject method, an attenuation map based on the Defrise-Rezaei-Nuyts comparison method, and the true value of the attenuation map, respectively. FIGS. 4D, 4E, and 4F show sinograms corresponding to the attenuation maps of FIGS. 4A, 4B, and 4C, respectively. FIGS. 4G, 4H, and 4I show a reconstructed tracer distribution based on the subject method, a reconstructed tracer distribution based on the Defrise-Rezaei-Nuyts comparison method, and the true value of the tracer distribution, respectively. FIG. 5 plots the sinogram profiles along column 64 (left-most profiles), 128 (middle profile), and 192 (right-most profile). In FIG. 5, the true value is depicted by the blue line, the estimated value based on the subject method is depicted by the red line, and the estimated value based on the Defrise-Rezaei-Nuyts comparison method is depicted by the green line. A parallel projection geometry was assumed. The ROI was defined on a disk. In the back-projection process, pixels outside the disk gained some non-negative values. Those values were forward-projected to the sinogram. That is why the tails of the 128$^{th}$ profile are non-negative. Because those tails are outside the LORs, they do not affect the reconstruction of the tracer distribution.

From the computed sinograms, a non-TOF PET data of the same phantom was reconstructed under the same scanning protocol. An expectation maximization (EM) method with total variation (TV) regularization was used. Further detail on such an EM method is provided in Panin et al. ("Restoration of fine azimuthal sampling of measured TOF projection data," *IEEE Nuclear Science Symposium Conference Record* (*NSS/MIC*), 2010) and Yan et al. ("Expectation maximization and total variation-based model for computed tomography reconstruction from undersampled data," *SPIE Medical Imaging*. International Society for Optics and Photonics, 2011), both of which are hereby incorporated by reference in their entireties.

FIG. 4G shows the resultant reconstructed tracer distribution based on the subject method, and FIG. 4H shows the resultant reconstructed tracer distribution based on the Defrise-Rezaei-Nuyts comparison method. FIG. 4I shows the true tracer distribution.

Example 2

Figure 6A:
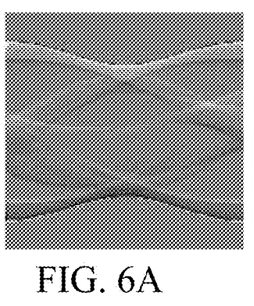
FIG. 6A shows estimated derivatives.
Figure 6B:
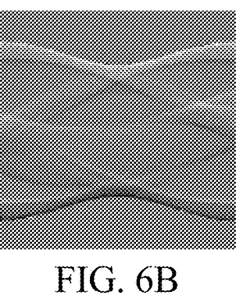
FIG. 6B shows corrected derivatives.
Figure 6C:
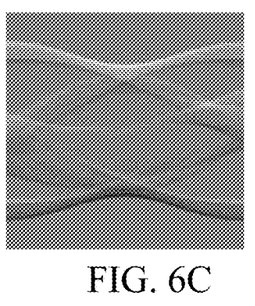
FIG. 6C shows true values of derivatives.
Figure 7A:
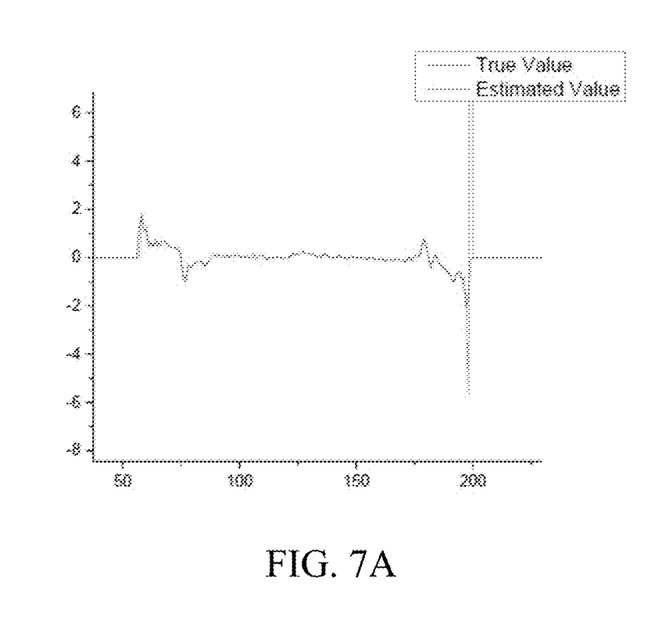
FIG. 7A shows a plot of the vertical profile for true and estimated values.
Figure 7B:
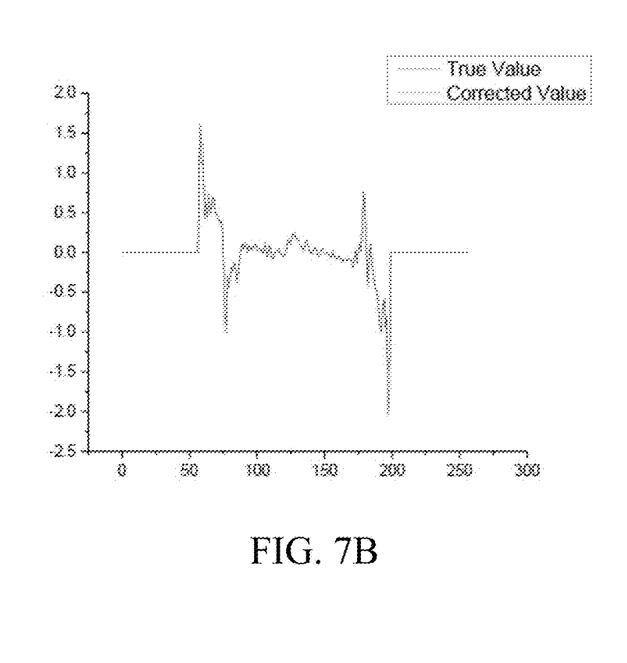
FIG. 7B shows the plot of FIG. 7A after boundary correction.

The simulation of Example 1, using the digital phantom from Example 1, was repeated with an increased time resolution of 500 ps. The boundaries indeterminacy can be seen clearly in the estimated derivatives in FIG. 6. FIG. 6A shows estimated derivatives, FIG. 6B shows corrected derivatives, and FIG. 6C shows true values of derivatives. In the Defrise-Rezaei-Nuyts comparison method, to suppress these errors, the TOF PET data were smoothed with different Gaussian kernels in three dimensions before estimating the derivatives. In the subject method, it was noted that in the noise-free estimation most of the estimates were very close to the true numbers except for the boundary values. Thus, a boundary correction method was implemented using a median filter around the boundaries. FIG. 7 plots the vertical profile through the center of the derivatives of the sinogram. FIG. 7A shows a plot of the vertical profile for true and estimated values. FIG. 7B shows the plot of FIG. 7A after boundary correction. In both FIGS. 7A and 7B, the true value is depicted by the blue line, and the value estimated using the subject method is depicted by the red line. Referring to FIGS. 6A-6C and 7A-7B, the median filter removed most of the large variations from the boundary effect.

Figure 8A:
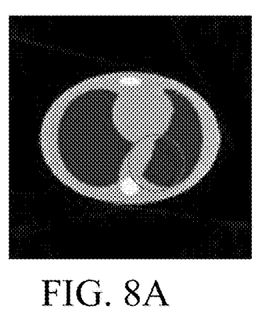
FIG. 8A shows an attenuation map based on an embodiment of the subject invention.
Figure 8B:
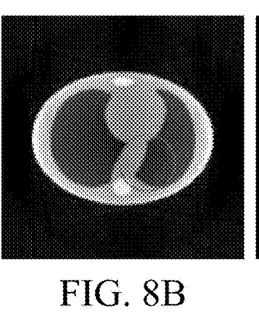
FIG. 8B shows an attenuation map based on a comparison method.
Figure 8C:
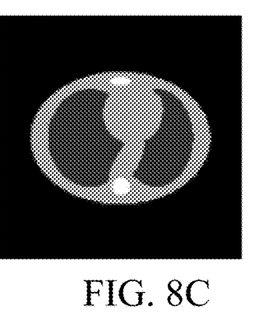
FIG. 8C shows a true value of the attenuation map.
Figure 8D:
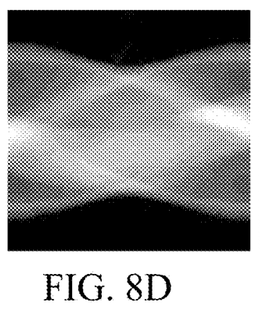
FIG. 8D shows a sinogram corresponding to the attenuation map of FIG. 8A.
Figure 8E:
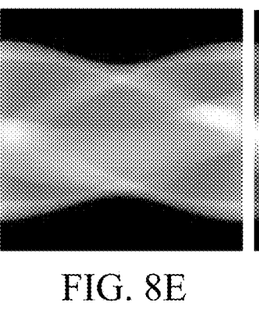
FIG. 8E shows a sinogram corresponding to the attenuation map of FIG. 8B.
Figure 8F:
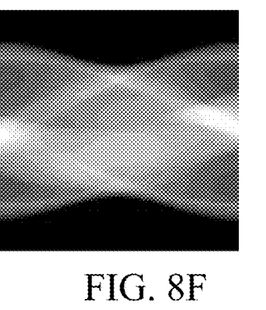
FIG. 8F shows a sinogram corresponding to the attenuation map of FIG. 8C.

FIGS. 8A, 8B, and 8C show an attenuation map based on the subject method, an attenuation map based on the Defrise-Rezaei-Nuyts comparison method, and the true value of the attenuation map, respectively. FIGS. 8D, 8E, and 8F show sinograms corresponding to the attenuation maps of FIGS.

Figure 8G:
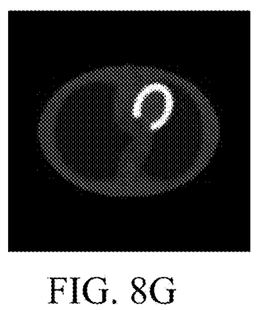
FIG. 8G shows a reconstructed tracer distribution based on an embodiment of the subject invention.
Figure 8H:
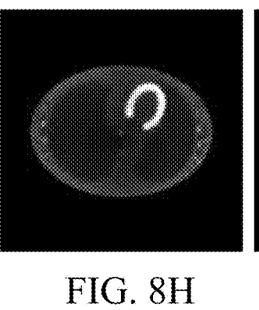
FIG. 8H shows a reconstructed tracer distribution based on a comparison method.
Figure 8I:
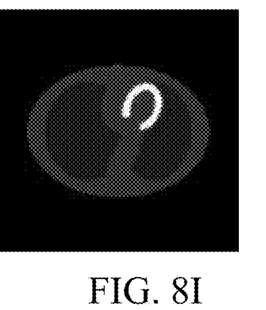
FIG. 8I shows a true value of the tracer distribution.

8A, 8B, and 8C, respectively. FIGS. 8G, 8H, and 8I show a reconstructed tracer distribution based on the subject method, a reconstructed tracer distribution based on the Defrise-Rezaei-Nuyts comparison method, and the true value of the tracer distribution, respectively. Referring to FIGS. 8A and 8B, it can still be observed that there are some artifacts in the estimated attenuation maps in the red circles covering a high tracer concentration. These artifacts can be explained by the second boundary case, and can be difficult to identify in the estimated sinogram. However, these artifacts seemed to have little to no interference on the reconstruction of the tracer distribution (see, e.g., FIGS. 8G and 8I).

Example 3

The simulation of Example 1, using the digital phantom from Example 1, was repeated with noisy data. Because noise at boundaries can be exaggerated, the temporal resolution of the TOF profile was 100 ps. Poisson noise was added with the maximum count of expected photons being 25. To suppress noise, the TOF PET data were smoothed with Gaussian kernels (e.g., as discussed in the Defrise-Rezaei-Nuyts comparison method), and the boundary correction method was also applied.

Figure 9A:
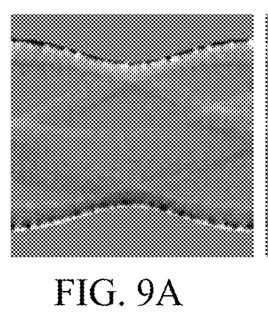
FIG. 9A shows estimated derivatives.
Figure 9B:
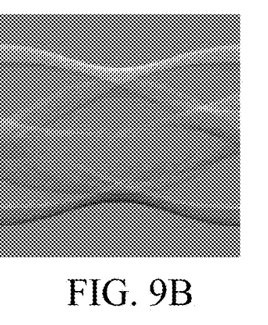
FIG. 9B shows true values of derivatives.
Figure 10A:
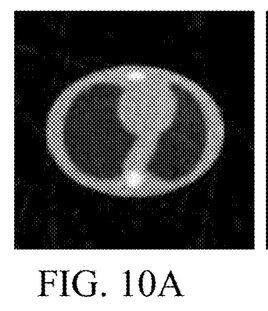
FIG. 10A shows an attenuation map based on an embodiment of the subject invention.
Figure 10B:
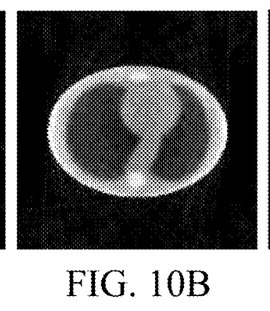
FIG. 10B shows an attenuation map based on a comparison method.
Figure 10C:
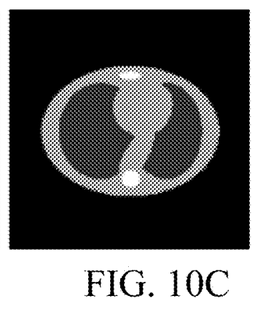
FIG. 10C shows a true value of the attenuation map.
Figure 10D:
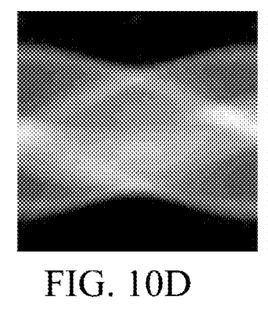
FIG. 10D shows a sinogram corresponding to the attenuation map of FIG. 10A.
Figure 10E:
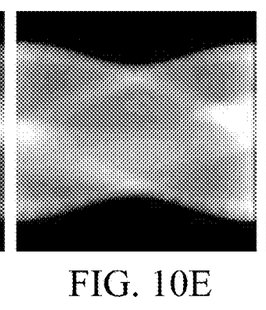
FIG. 10E shows a sinogram corresponding to the attenuation map of FIG. 10B.
Figure 10F:
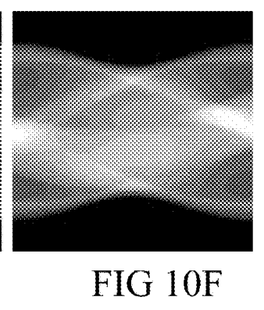
FIG. 10F shows a sinogram corresponding to the attenuation map of FIG. 10C.
Figure 10G:
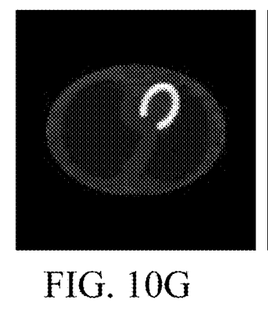
FIG. 10G shows a reconstructed tracer distribution based on an embodiment of the subject invention.
Figure 10H:
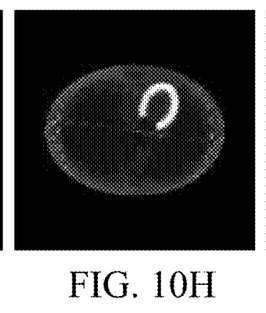
FIG. 10H shows a reconstructed tracer distribution based on a comparison method.
Figure 10I:
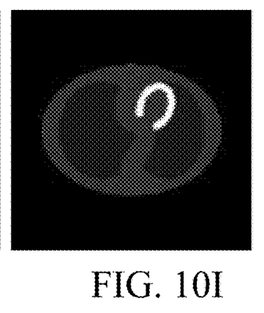
FIG. 10I shows a true value of the tracer distribution.
Figure 11A:
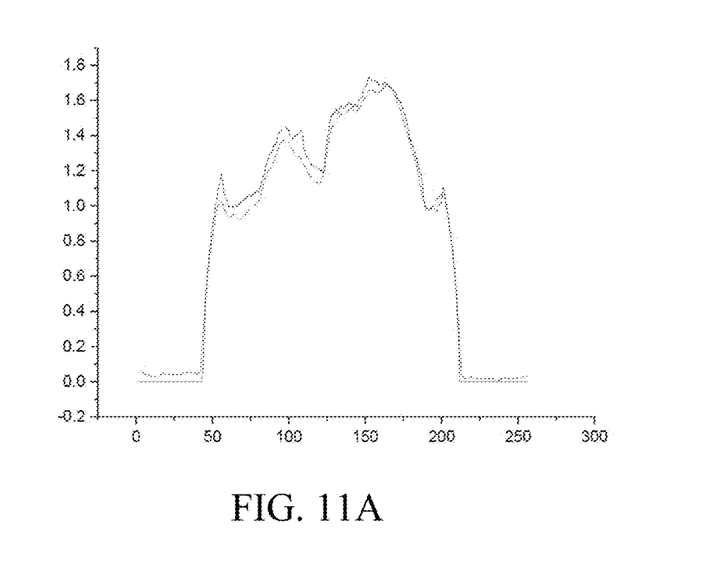
FIG. 11A shows a plot of sinogram profiles for true values and for values obtained using a method according to an embodiment of the subject invention.
Figure 11B:
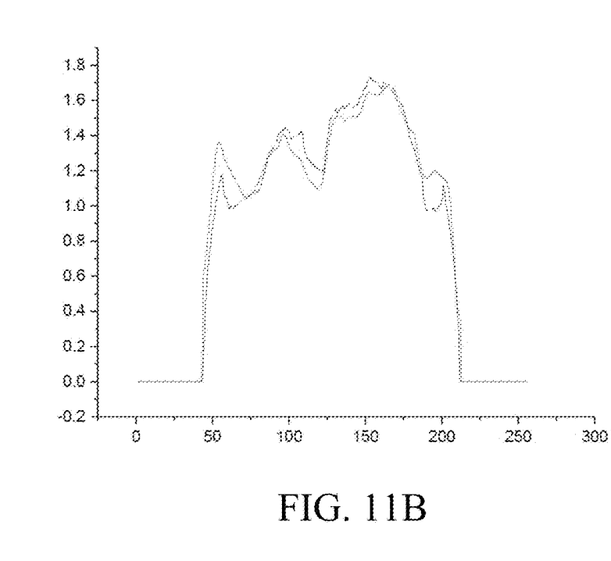
FIG. 11B shows a plot of sinogram profiles for true values and for values obtained using a comparison method.

FIG. 9A shows estimated derivatives, and FIG. 9B shows true values of derivatives. FIGS. 10A, 10B, and 10C show an attenuation map based on the subject method, an attenuation map based on the Defrise-Rezaei-Nuyts comparison method, and the true value of the attenuation map, respectively. FIGS. 10D, 10E, and 10F show sinograms corresponding to the attenuation maps of FIGS. 10A, 10B, and 10C, respectively. FIGS. 10G, 10H, and 10I show a reconstructed tracer distribution based on the subject method, a reconstructed tracer distribution based on the Defrise-Rezaei-Nuyts comparison method, and the true value of the tracer distribution, respectively. FIG. 11A shows a plot of the sinogram profiles along the $64^{th}$ column for the true values (black line) and the values estimated using the subject method (red line). FIG. 11B shows a plot of the sinogram profiles along the $64^{th}$ column for the true values (black line) and the values estimated using the Defrise-Rezaei-Nuyts comparison method (red line). Referring to FIGS. 9, 10, and 11, the subject method is in excellent agreement with both the true values and the outcome produced using the Defrise-Rezaei-Nuyts comparison method, which utilized prior knowledge to eliminate the constant uncertainty in the attenuation sinogram estimation. That is, the subject method can estimate an attenuation map, sinogram, and tracer distribution accurately without any prior knowledge on the attenuation data (e.g., attenuation background, sinogram, tracer distribution, attenuation correction map). No such knowledge is needed prior to initiating the method.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

BRONNIKOV, Andrei V. "Reconstruction of attenuation map using discrete consistency conditions," *IEEE Transactions on Medical Imaging*, 2000, 19(5):451-462.

CENSOR, Yair, et al., "A new approach to the emission computerized tomography problem: simultaneous calculation of attenuation and activity coefficients," *IEEE Transactions on Nuclear Science*, 1979, 26(2):2775-2779.

CHARTRAND, Rick. "Numerical differentiation of noisy, nonsmooth data," ISRN Applied Mathematics, 2011.

CONG, W. et al., "Fourier transform-based iterative method for differential phase-contrast computed tomography," *Optics Letters*, 2012, 37(11):1784-1786.

CONTI, Maurizio. "State of the art and challenges of time-of-flight PET," *Physica Medica*, 2009, 25(1):1-11.

DEFRISE, M. et al., "Time-of-flight PET data determine the attenuation sinogram up to a constant," *Physics in Medicine and Biology*, 2012, 57(4):885-899.

DICKEN, Volker. "A new approach towards simultaneous activity and attenuation reconstruction in emission tomography," *Inverse Problems*, 1999, 15(4):931.

FARIS, G. W. et al., "Three-dimensional beam-deflection optical tomography of a supersonic jet," *Applied Optics*, 1988, 27(24):5202-5212.

GOULD, K. Lance, et al., "Frequent diagnostic errors in cardiac PET/CT due to misregistration of CT attenuation and emission PET images: a definitive analysis of causes, consequences, and corrections," *Journal of Nuclear Medicine*, 2007, 48(7):1112-1121.

HUANG, Sung-Cheng, et al., "Quantitation in positron emission computed tomography: Effects of inaccurate attenuation correction," *Journal of Computer Assisted Tomography*, 1979, 3(6):804-hyhen.

KARP, Joel S., et al., "Benefit of time-of-flight in PET: experimental and clinical results," *Journal of Nuclear Medicine*, 2008, 49(3):462-470.

KOHLER, T. et al., "Iterative reconstruction for differential phase contrast imaging using spherically symmetric basis functions," *Med. Phys.*, 2011, 38:4542-4545.

NOO, F. et al., "A two-step Hilbert transform method for 2D image reconstruction," *Physics in Medicine and Biology*, 2004, 49(17):3903-3923.

NUYTS, Johan, et al., "Simultaneous maximum a posteriori reconstruction of attenuation and activity distributions from emission sonograms," *IEEE Transactions on Medical Imaging*, 1999, 18(5):393-403.

PANIN, V. Y., et al., "Total variation regulated EM algorithm [SPECT reconstruction]," *IEEE Transactions on Nuclear Science*, 1999, 46(6):2202-2210.

PANIN, V. Y. et al., "Restoration of fine azimuthal sampling of measured TOF projection data," *IEEE Nuclear Science Symposium Conference Record (NSS/MIC)*, 2010.

PARK, Sang-June, et al., "Evaluation of the combined effects of target size, respiratory motion and background activity on 3D and 4D PET/CT images," *Physics in Medicine and Biology*, 2008, 53(13):3661.

REZAEI, Ahmadreza et al., "Simultaneous reconstruction of activity and attenuation in time-of-flight PET," *Nuclear Science Symposium and Medical Imaging Conference (NSS/MIC)*, 2011 IEEE.

WELCH, A., et al., "Attenuation correction in PET using consistency information," *IEEE Transactions on Nuclear Science*, 1998, 45(6):3134-3141.

XIA, Ting et al., "Limits of ultra-low dose CT attenuation correction for PET/CT," *Nuclear Science Symposium Conference Record (NSS/MIC)*, 2009 IEEE.

XIA, Ting, et al., "Ultra-low dose CT attenuation correction for PET/CT," *Physics in Medicine and Biology*, 2012, 57(2):309.

YAN, Ming, et al., "Expectation maximization and total variation-based model for computed tomography reconstruction from undersampled data," *SPIE Medical Imaging*. International Society for Optics and Photonics, 2011.

ZAIDI, Habib et al., "Determination of the attenuation map in emission tomography," *Journal of Nuclear Medicine,* 2003, 44(2):291-315.

What is claimed is:

1. A method for reconstructing an attenuation map for a positron emission tomography (PET) image, the method comprising:
    obtaining time-of-flight (TOF) PET data of the PET image;
    estimating the gradient of an attenuation sinogram; and
    determining, by a processor, the attenuation map using the estimated gradient of the attenuation sinogram by performing an algorithm,
    wherein performing the algorithm comprises using the following equation to determine the attenuation map:

$$\mu(x, y) = \int_\theta^{\theta+\pi} \int_{-\infty}^{+\infty} \mathcal{F}\left[\frac{\partial g(s, \theta)}{\partial s}\right]\left[\frac{1}{2\pi}(-i\operatorname{sgn}\omega)\right]e^{2\pi i\omega(x\sin\theta + y\sin\theta)} d\theta,$$

where $\mathcal{F}$ is the Fourier transform, $g(\theta,s)$ is the Radon transform, and $\mu(x,y)$ is the attenuation map.

2. The method according to claim 1, wherein no attenuation information is known prior to performing the method, and wherein the TOF PET data includes no attenuation information of the PET image.

3. The method according to claim 1, further comprising forward-projecting the determined attenuation map to obtain an estimated attenuation sinogram.

4. The method according to claim 1, wherein performing the algorithm comprises using extended formulations in cone-beam or other geometries in reference to analytic or iterative cone-beam reconstruction work in the X-ray computed tomography (CT) field.

5. A method for reconstructing an attenuation map for a positron emission tomography (PET) image, the method comprising:
    obtaining time-of-flight (TOF) PET data of the PET image;
    estimating the gradient of an attenuation sinogram; and
    determining, by a processor, the attenuation map using the estimated gradient of the attenuation sinogram by performing an algorithm,
    wherein estimating the gradient of the attenuation sinogram comprises using the following analytical scheme:

$$\frac{\partial g}{\partial s} = -\frac{J_s H_{\theta\theta} - J_\theta H_{s\theta}}{H_{ss}H_{\theta\theta} - H_{s\theta}^2}$$

$$\frac{\partial g}{\partial \theta} = -\frac{J_\theta H_{ss} - J_s H_{s\theta}}{H_{ss}H_{\theta\theta} - H_{s\theta}^2}$$

where $m(\theta,s,t)$ is a measurement along a line of the TOF PET data and $g(\theta,s)$ is the Radon transform, where $$H_{ss} = \int_\tau (mt + \sigma^2 \partial_t m)^2 dt, \quad H_{s\theta} = \int_\tau m(mt + \sigma^2 \partial_t m) dt,$$

$$H_{\theta\theta} = \int_\tau m^2 dt,$$

$$J_s = \int_\tau (D[m])(mt + \sigma^2 \partial_t m) dt, \quad J_\theta = \int_\tau (D[m]) m\, dt,$$

and the operator $D[\cdot]$ is defined as $$D[m(\theta, s, t)] = t\frac{\partial m}{\partial s} + \frac{\partial m}{\partial \theta} - s\frac{\partial m}{\partial t} + \sigma^2 \frac{\partial^2 m}{\partial s \partial t}.$$

6. The method according to claim 5, wherein performing the algorithm comprises using the following equation to determine the attenuation map:

$$\mu(x, y) = \int_\theta^{\theta+\pi} \int_{-\infty}^{+\infty} \mathcal{F}\left[\frac{\partial g(s, \theta)}{\partial s}\right]\left[\frac{1}{2\pi}(-i\operatorname{sgn}\omega)\right]e^{2\pi i\omega(x\sin\theta + y\sin\theta)} d\theta,$$

where $\mathcal{F}$ is the Fourier transform and $\mu(x,y)$ is the attenuation map.

7. The method according to claim 6, further comprising:
    forward-projecting the determined attenuation map to obtain an estimated attenuation sinogram; and
    using the determined attenuation map to estimate a tracer distribution of the PET image.

8. The method according to claim 5, wherein performing the algorithm comprises using extended formulations in cone-beam or other geometries in reference to analytic or iterative cone-beam reconstruction work in the X-ray computed tomography (CT) field.

9. A computer-readable medium having computer-executable instructions for performing a method, the method comprising:
    obtaining time-of-flight (TOF) positron emission tomography (PET) data of a PET image;
    estimating the gradient of an attenuation sinogram; and
    determining an attenuation map for the PET image using the estimated gradient of the attenuation sinogram by performing an algorithm,
    wherein performing the algorithm comprises using the following equation to determine the attenuation map:

$$\mu(x, y) = \int_\theta^{\theta+\pi} \int_{-\infty}^{+\infty} \mathcal{F}\left[\frac{\partial g(s, \theta)}{\partial s}\right]\left[\frac{1}{2\pi}(-i\operatorname{sgn}\omega)\right]e^{2\pi i\omega(x\sin\theta + y\sin\theta)} d\theta,$$

where $\mathcal{F}$ is the Fourier transform, $g(\theta,s)$ is the Radon transform, and $\mu(x,y)$ is the attenuation map.

10. The computer-readable medium according to claim 9, wherein no attenuation information is known prior to performing the method, and wherein the TOF PET data includes no attenuation information of the PET image.

11. The computer-readable medium according to claim 9, wherein the method further comprises forward-projecting the determined attenuation map to obtain an estimated attenuation sinogram.

12. The computer-readable medium according to claim 9, wherein performing the algorithm comprises using extended formulations in cone-beam or other geometries in reference to analytic or iterative cone-beam reconstruction work in the X-ray computed tomography (CT) field.

13. A computer-readable medium having computer-executable instructions for performing a method, the method comprising:
    obtaining time-of-flight (TOF) positron emission tomography (PET) data of a PET image;
    estimating the gradient of an attenuation sinogram; and
    determining an attenuation map for the PET image using the estimated gradient of the attenuation sinogram by performing an algorithm,
    wherein estimating the gradient of the attenuation sinogram comprises using the following analytical scheme:

$$\frac{\partial g}{\partial s} = -\frac{J_s H_{\theta\theta} - J_\theta H_{s\theta}}{H_{ss}H_{\theta\theta} - H_{s\theta}^2}$$

$$\frac{\partial g}{\partial \theta} = -\frac{J_\theta H_{ss} - J_s H_{s\theta}}{H_{ss}H_{\theta\theta} - H_{s\theta}^2}$$

where m(θ,s,t) is a measurement along a line of the TOF PET data and g(θ,s) is the Radon transform,
where $$H_{ss} = \int_\tau (mt + \sigma^2 \partial_t m)^2 \, dt, \; H_{s\theta} = \int_\tau m(mt + \sigma^2 \partial_t m) \, dt,$$

$$H_{\theta\theta} = \int_\tau m^2 \, dt,$$

$$J_s = \int_\tau (D[m])(mt + \sigma^2 \partial_t m) \, dt, \; J_\theta = \int_\tau (D[m]) m \, dt,$$

and the operator D[·] is defined as $$D[m(\theta, s, t)] = t\frac{\partial m}{\partial s} + \frac{\partial m}{\partial \theta} - s\frac{\partial m}{\partial t} + \sigma^2 \frac{\partial^2 m}{\partial s \partial t}.$$

14. The computer-readable medium according to claim 13, wherein performing the algorithm comprises using the following equation to determine the attenuation map:

$$\mu(x, y) = \int_\theta^{\theta+\pi} \int_{-\infty}^{+\infty} \mathcal{F}\left[\frac{\partial g(s, \theta)}{\partial s}\right]\left[\frac{1}{2\pi}(-i\,\mathrm{sgn}\,\omega)\right] e^{2\pi i \omega(x\sin\theta + y\sin\theta)} \, d\theta,$$

where $\mathcal{F}$ is the Fourier transform and μ(x,y) is the attenuation map.

15. The computer-readable medium according to claim 14, wherein the method further comprises:
forward-projecting the determined attenuation map to obtain an estimated attenuation sinogram; and
using the determined attenuation map to estimate a tracer distribution of the PET image.

16. The computer-readable medium according to claim 13, wherein performing the algorithm comprises using extended formulations in cone-beam or other geometries in reference to analytic or iterative cone-beam reconstruction work in the X-ray computed tomography (CT) field.

17. The method according to claim 5, wherein no attenuation information is known prior to performing the method, and wherein the TOF PET data includes no attenuation information of the PET image.

18. The computer-readable medium according to claim 13, wherein no attenuation information is known prior to performing the method, and wherein the TOF PET data includes no attenuation information of the PET image.

19. The method according to claim 1, wherein no sub-region in the attenuation map is known prior to performing the method.

20. The method according to claim 5, wherein no sub-region in the attenuation map is known prior to performing the method.

21. The computer-readable medium according to claim 9, wherein no sub-region in the attenuation map is known prior to performing the method.

22. The computer-readable medium according to claim 13, wherein no sub-region in the attenuation map is known prior to performing the method.

\* \* \* \* \*

UNITED STATES PATENT AND TRADEMARK OFFICE
CERTIFICATE OF CORRECTION

PATENT NO. : 9,600,910 B2
APPLICATION NO. : 14/592691
DATED : March 21, 2017
INVENTOR(S) : Wang et al.

It is certified that error appears in the above-identified patent and that said Letters Patent is hereby corrected as shown below:

In the Specification

Column 5,
Line 60, " $g(\theta,s) = \int_{-\infty}^{\infty} \mu(s\cos\theta - l\sin, s\sin\theta + l\cos\theta) dl$ ' " should read
-- $g(\theta, s) = \int_{-\infty}^{\infty} \mu(s\cos\theta - l\sin\theta, s\sin\theta + l\cos\theta)\, dl.$ --

Column 7,
Line 52, " $\mu(x,y) = \int_{\theta}^{\theta+\pi} \int_{-\infty}^{+\infty} \mathcal{F}\left[\frac{\partial g(s,\theta)}{\partial s}\right] \left[\frac{1}{2\pi}(-i\,\text{sgn}\omega)\right] e^{2\pi i\omega(x\sin\theta + y\sin\theta)}\, d\theta$ ' " should read
-- $2\pi i \omega \mathcal{F}[g(s,\theta)] = \mathcal{F}\left[\frac{\partial g(s,\theta)}{\partial s}\right]$ --

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*